April 18, 1950 — P. T. MENKE — 2,504,563
GAUGE LINE HOLDER AND WIPER
Filed May 8, 1946
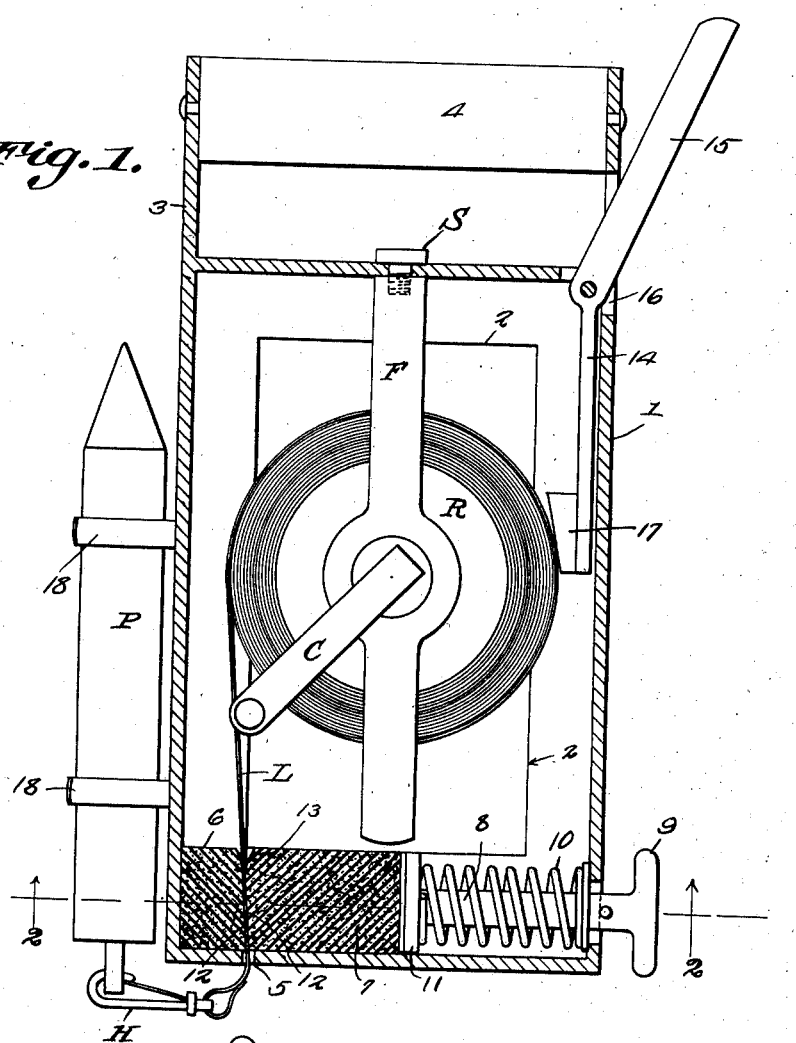
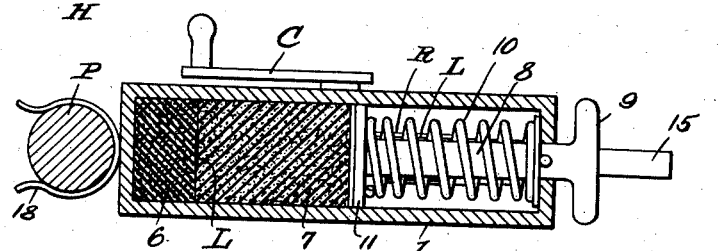
P. T. Menke
INVENTOR.
ATTORNEYS.

Patented Apr. 18, 1950

2,504,563

UNITED STATES PATENT OFFICE 2,504,563

GAUGE LINE HOLDER AND WIPER

Paul T. Menke, Monahans, Tex., assignor of one-half to Albert Menke, Bostwick, Nebr.

Application May 8, 1946, Serial No. 668,240

4 Claims. (Cl. 242—84.8)

This invention relates to a gauge line holder and wiper and is designed primarily to hold gauge lines such as sold to the public and commonly used in the oil drilling and other industries.

It is a fact well known to those skilled in the art that these gauge lines soon become covered with films of oil and other substances which interfere with the proper use of the lines.

An object of the present invention is to provide a means for holding the gauge line in position relative to a wiping element and a brake device, the holder also being equipped with a supplemental means by which a plumb bob can be detachably held in place on the holder when the line is not in use.

A further object is to provide a holder with wiper, brake and plumb bob which can be sold complete to the trade and in which the usual gauge line frame can be mounted for cooperation with the wiper and brake.

A further object is to provide a structure of this character which will thoroughly wipe off the surfaces of the gauge line as the line is reeled in, there being supplemental means by which the speed of rotation of the line carrier can be regulated.

A still further object is to provide a structure of this character which is simple, compact and durable and can easily be carried from place to place.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing:

Figure 1 is a vertical transverse section through the holder constituting the present invention, a gauge line being shown in position therein and the wiping means, gauge line brake, and plumb bob holder being shown in elevation.

Figure 2 is a section on line 2—2, Figure 1.

Referring to the figures by characters of reference, 1 designates a box-like frame open at the front and back as indicated at 2 and provided at the top with arms 3 which are spaced apart and serve to support a handle or grip 4. A slot 5 is provided in the bottom of the frame and is proportioned to permit a gauge line L to slide freely therethrough.

Mounted in the bottom portion of the frame 1 at one side thereof and between said side and the slot 5, is a stationary wiping element or block 6 which can be formed of rubber or any other suitable material and also located in the bottom portion of the frame 1 is a movable wiping element or block 7 connected to a plunger 8 which extends through one side of the frame 1 and has a cross-head 9 at its outer end. A spring 10 is mounted on the plunger and thrusts at one end against the side of frame 1, and on its other end thrusts against the head 11 carried by the the plunger and bearing against the block 7. As the spring 10 is constantly under compression, it constantly urges the block 7 towards the block 6 so that the cooperating ends of the two blocks would normally be positioned substantially in line with the slot 5. The upper ends of the wiping faces 12 of the blocks preferably diverge along curved lines as indicated at 13.

Pivotally mounted in the upper portion of the frame 1 at one side thereof is a brake lever 14 having a handle 15 extending upwardly and outwardly therefrom through a slot 16 in one of the arms 3 and in a portion of the frame 1. The upper end of this handle is positioned adjacent to but beyond one end of the handle or grip 4 where it can readily be pressed outwardly by a finger of the hand holding the grip 4.

A brake shoe 17 is carried by the lower end of lever 14 and is located in the frame 1, this brake shoe being positioned where it can be moved into engagement with the gauge line L as hereinafter explained.

Spring clips 18 are extended from one side of the frame 1 and are proportioned to detachably engage and hold a plumb bob P which can be detachably joined to one end of the gauge line L by means of a snap hook H.

The gauge line L is mounted on a reel R such as commonly employed, this reel being rotatably mounted in a reel frame F which is detachably supported within frame 1 and secured to and suspended from the top thereof by means of a screw S or the like. A crank arm C connected to the reel can be used for winding the gauge line on the reel in the customary manner. The frame F, reel R, crank arm C and gauge line L are all parts which can be purchased in the open market. When it is desired to use the same in connection with the invention, repeating the subject matter of the present application, the frame end of the reel is inserted into the frame 1 and secured in place by the screw S. The line L is inserted between the wiping faces 12 of the blocks 6 and 7, block 7 being retracted by means of crosshead 9 and against the action of spring 10 in order to permit this insertion. Thereafter block 7 is released so that the spring 10 will force it against the line and cause the line to be clamped between the faces 12. That end of the line L projecting beyond the slot 5 carries the snap hook H which detachably engages the plumb bob P, this plumb bob being detachably held by the clips 18.

In using the gauge line the same is lowered in the usual manner after the plumb bob has been disconnected from clips 18. This lowering can be facilitated by pulling on the cross-head 9 so that there will be no excessive frictional engagement with the line. However, the weight of the plumb-bob is generally sufficient to cause the line to unwind from its reel and during this unwinding operation the pressure on the upper end of the handle 15 will cause the brake shoe 17 to bear against the exposed surface of the line with sufficient force to retard the descent of the plumb bob.

When the crank arm C is turned in one direction the line will be reeled in and as this is done while the line is being gripped by the wiping faces 12, it will be apparent that any accumulations of oil or other foreign substances on the faces of the line will be wiped therefrom so that the line thus is left clean for subsequent use.

What is claimed is:

1. A holder for gauge lines including a box frame, said box frame being proportioned to receive and hold a gauge line reel frame, a fixed wiping element enclosed by the box frame, a movable wiping element enclosed by and slidable within the box frame, the sides of the box frame constituting a guideway for the movable wiping element, said elements having cooperating wiping faces, there being a slot in the box frame in line with said faces and proportioned to receive a gauge line, and retractable spring means mounted inside the box frame and adapted to hold the movable wiping element normally pressed toward the fixed wiping element, thereby to maintain the wiping surfaces of said elements normally in contact with the opposed faces of the gauge line when extended therebetween.

2. A holder for gauge lines including a carrying handle, a box frame secured to and supporting the handle, said box frame being proportioned to receive and hold a gauge line reel frame, fixed and movable wiping elements mounted in the bottom of the box frame, the movable element being slidable between opposed sides of the box frame, said elements having cooperating wiping faces, there being a slot in the bottom of the box frame in line with said faces and proportioned to receive a gauge line, retractable spring means for holding the movable wiping element normally pressed toward the fixed wiping element, thereby to maintain the wiping surfaces of said elements normally in contact with the opposed faces of the gauge line when extended therebetween, a depending brake lever fulcrumed in the top of the box frame and extended downwardly along one side of the box frame, a brake shoe on the lower end of the lever positioned to engage the smooth surface of the gauge line, and a brake lever handle extended upwardly from the lever to a point adjacent to the carrying handle for engagement and actuation by a hand carrying the holder.

3. A holder for gauge lines including a carrying handle, a box frame secured to and supporting the handle, the box frame being proportioned to hold and substantially enclose a reel frame, opposed fixed and movable wiping elements carried by the bottom and enclosed by the sides of the box frame, the movable element being slidable along said bottom and sides, retractable spring means for holding the movable wiping element normally pressed toward the fixed wiping element thereby to maintain the wiping surfaces of said elements normally in contact with the opposed faces of a gauge line when extended therebetween, a brake lever dependingly carried within and pivotally connected to the box frame, a brake shoe carried by the lower end of the brake lever, and a brake lever handle extending from the brake lever to a point adjacent the carrying handle.

4. In a wiping device for gauge lines, a box frame, means for connecting a reel frame to the box frame, a fixed wiper element connected to the box frame, a movable wiper element slidable between opposed sides of the box frame, said elements having cooperating wiping faces, there being a slot in the box frame in line with said faces and proportioned to receive a gauge line, and a retractable spring means connected to the movable wiper element and slidably mounted in the box frame, adapted to hold the movable wiping element normally pressed toward the stationary wiping element, thereby to maintain the wiping surfaces of said elements normally in contact with the opposed faces of the gauge line when extended therebetween.

PAUL T. MENKE.

REFERENCES CITED

The following references are of record in the file of this patent:

UNITED STATES PATENTS

| Number | Name | Date |
| --- | --- | --- |
| 1,991,263 | Stewart | Feb. 12, 1935 |
| 2,035,379 | Stewart | Mar. 24, 1936 |
| 2,150,086 | Truman | Mar. 7, 1939 |
| 2,157,024 | Smith | May 2, 1939 |